(12) United States Patent
Shimizu et al.

(10) Patent No.: US 10,870,054 B2
(45) Date of Patent: Dec. 22, 2020

(54) NON-TRANSITORY STORAGE MEDIUM ENCODED WITH GAME PROGRAM READABLE BY COMPUTER OF INFORMATION PROCESSING APPARATUS WHICH CAN ENHANCE ZEST, GAME DEVICE, METHOD OF CONTROLLING GAME DEVICE, AND GAME SYSTEM

(71) Applicant: NINTENDO CO., LTD., Kyoto (JP)

(72) Inventors: Takao Shimizu, Kyoto (JP); Tomoyoshi Yamane, Kyoto (JP); Pacôme Danhiez, Paris (FR); Yann Benigot, Paris (FR); Jean-Francois Vidal, Paris (FR); Emeric Pascual, Paris (FR); Yacine Belkadi, Paris (FR); Laurent Hiriart, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 241 days.

(21) Appl. No.: 15/846,605

(22) Filed: Dec. 19, 2017

(65) Prior Publication Data
US 2019/0022529 A1   Jan. 24, 2019

(30) Foreign Application Priority Data
Jul. 24, 2017 (JP) .................................. 2017-142553

(51) Int. Cl.
*A63F 13/00* (2014.01)
*A63F 13/533* (2014.01)
*A63F 13/493* (2014.01)

(52) U.S. Cl.
CPC .......... *A63F 13/533* (2014.09); *A63F 13/493* (2014.09)

(58) Field of Classification Search
CPC ........ A63F 13/49; A63F 13/10; A63F 13/533; H04N 21/432
See application file for complete search history.

(56) References Cited

U.S. PATENT DOCUMENTS

| 6,699,127 | B1 | 3/2004 | Lobb et al. | |
|---|---|---|---|---|
| 2009/0153567 | A1* | 6/2009 | Jung | G06T 13/00 345/473 |
| 2010/0160038 | A1* | 6/2010 | Youm | A63F 13/497 463/29 |

(Continued)

FOREIGN PATENT DOCUMENTS

JP   H11-235468   8/1999

*Primary Examiner* — Omkar A Deodhar
*Assistant Examiner* — Eric M Thomas
(74) *Attorney, Agent, or Firm* — Nixon & Vanderhye P.C.

(57) ABSTRACT

A non-transitory storage medium encoded with a game program executed by a computer of a game device connected to a display according to one aspect, the game program causing the computer to perform game processing for performing processing of a game, operation acceptance processing for accepting an operation onto the game, operation information recording processing for recording for a predetermined period, operation information accepted in the operation acceptance processing in the processing of the game, game replay processing for replaying a status of play of a game on the display based on the operation information recorded in the operation information recording processing, and game resumption processing for resuming the processing of the game from any position during replay in the game replay processing.

18 Claims, 13 Drawing Sheets

(56) References Cited

U.S. PATENT DOCUMENTS

2010/0190555 A1* 7/2010 Dutilly .................... A63F 13/79
                                                            463/43
2017/0006322 A1* 1/2017 Dury ....................... A63F 13/49

* cited by examiner

FIG.7

| DURATION OF GAME | OPERATION DATA |
|---|---|
| OO:OO:OO | A BUTTON |
|  | B BUTTON |
| ⋮ | ⋮ |

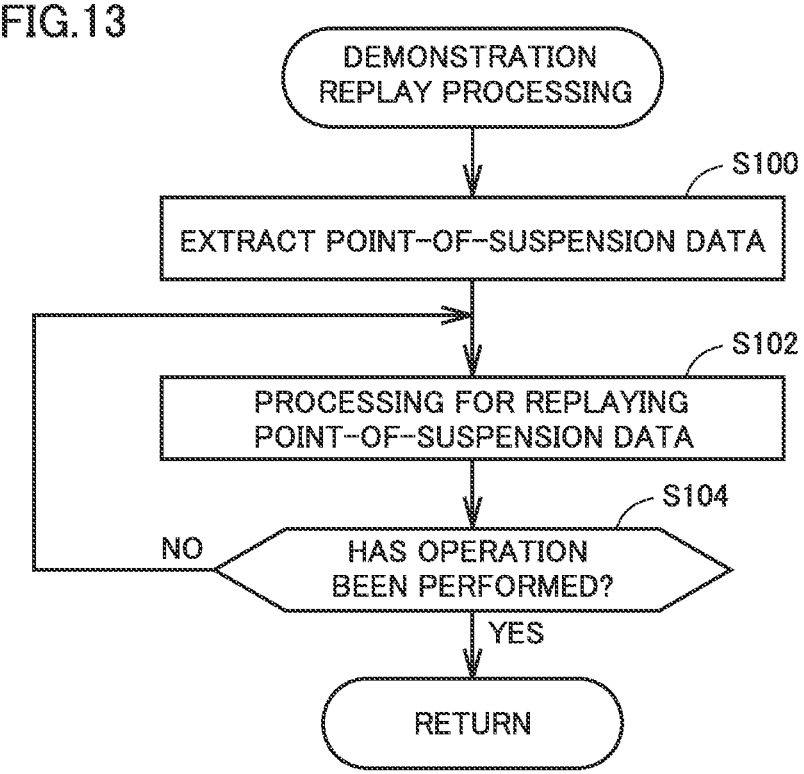

NON-TRANSITORY STORAGE MEDIUM ENCODED WITH GAME PROGRAM READABLE BY COMPUTER OF INFORMATION PROCESSING APPARATUS WHICH CAN ENHANCE ZEST, GAME DEVICE, METHOD OF CONTROLLING GAME DEVICE, AND GAME SYSTEM

This nonprovisional application is based on Japanese Patent Application No. 2017-142553 filed with the Japan Patent Office on Jul. 24, 2017, the entire contents of which are hereby incorporated by reference.

FIELD

The present disclosure relates to processing for controlling a game device.

BACKGROUND AND SUMMARY

In a conventional game device, predetermined data representing game contents is automatically saved at a predetermined point of a game during execution of the game. When the game is launched again after the game is suspended, an initial display screen is displayed with the automatically saved predetermined data, and the game can be resumed from the screen displayed based on the automatically saved predetermined data.

Since the game device saves the game at a predetermined point, the point where the game can be resumed is predetermined and the game cannot be resumed at an arbitrary position. Zest of the game is thus yet to be enhanced.

The present disclosure was made to solve the problem as above, and an object of the present disclosure is to provide a game program which can achieve enhanced zest of a game, a game device, a method of controlling a game device, and a game system.

A non-transitory storage medium encoded with a game program executed by a computer of a game device connected to a display according to one aspect, the game program causing the computer to perform game execution processing for performing processing of a game, operation acceptance processing for accepting an operation onto the game, operation information recording processing for recording for a predetermined period, operation information accepted in the operation acceptance processing in the processing of the game, game replay processing for replaying a status of play of the game on the display based on the operation information recorded in the operation information recording processing, and game resumption processing for resuming the processing of the game from any position during replay by the game replay processing.

In the game resumption processing, the processing of the game is resumed from any position during replay by the game replay processing. Therefore, zest of the game can be enhanced.

In the exemplary embodiment, in the operation acceptance processing, an operation to give a resumption instruction is accepted during replay by the game replay processing. In the game resumption processing, the processing of the game may be resumed from a position where the operation to give the resumption instruction is accepted in the operation acceptance processing during replay by the game replay processing.

Since the processing of the game is resumed from any position during replay by the game replay processing accepted in the operation acceptance processing, convenience of a user is high and zest of the game can be enhanced.

In the exemplary embodiment, in the operation information recording processing, the operation information accepted in the operation acceptance processing in the processing of the game may be recorded for the predetermined period before a point of suspension of the processing of the game.

Since the operation information is recorded for the predetermined period before a point of suspension of the processing of the game, the processing of the game is resumed not only from a position immediately before suspension but also from any position within the predetermined period. Therefore, convenience of a user is high and zest of the game can be enhanced.

In the exemplary embodiment, the game program further causes the computer to perform recording time period setting processing for setting the predetermined period during which the operation information is to be recorded in accordance with a type of the game, and in the operation information recording processing, the operation information accepted in the operation acceptance processing in the game processing may be recorded for the predetermined period set in the recording time period setting processing.

Since a predetermined time period during which the operation information is to be recorded is set depending on a type of a game, an optimal recording time period can be set depending on a type of the game. Convenience of a user is high and zest of the game can be enhanced.

In the exemplary embodiment, in the operation information recording processing, older operation information of the recorded operation information may sequentially be updated when recording of the operation information accepted in the operation acceptance processing in the processing of the game reaches the predetermined period.

By updating the operation information each time the predetermined period elapses, an occupancy of a memory to be used can be suppressed.

In the exemplary embodiment, a suspension start point is set every predetermined time period within the predetermined period and associated with at least one of a plurality of pieces of operation information recorded for the predetermined period. In the game replay processing, the processing of the game may be resumed based on the operation information recorded in the operation information recording processing associated with the set suspension start point.

Since the processing of the game can be resumed from the suspension start point set every predetermined time period within the predetermined period, convenience of a user is high and zest of the game can be enhanced.

In the exemplary embodiment, the game program further causes the computer to perform recording time period setting processing for setting the predetermined period during which the operation information is to be recorded in accordance with an instruction for the operation acceptance processing.

Since the predetermined period during which operation information is to be recorded can be set in accordance with an instruction for the operation acceptance processing, convenience of a user is high and zest of the game can be enhanced.

In the exemplary embodiment, the game program further causes the computer to perform menu screen control processing for displaying a menu screen on the display. In the game replay processing, when a predetermined condition is satisfied while the menu screen is displayed on the display as a result of the menu screen control processing, a status of play of the game may be replayed based on the operation information recorded in the operation information recording processing.

For example, when there is no operation for a certain period of time or longer while the menu screen is displayed, a status of play of the game is automatically replayed based on the recorded operation information. Therefore, a user can recall past contents of play and a motivation to resume the game can be provided to the user. Convenience of a user is high and zest of the game can be enhanced.

A game device connected to a display according to one aspect includes a processor.

The processor performs game execution processing for performing processing of a game, operation acceptance processing for accepting an operation onto the game, operation information recording processing for recording for a predetermined period, operation information accepted in the operation acceptance processing in the processing of the game, game replay processing for replaying a status of play of the game on the display based on the operation information recorded in the operation information recording processing, and game resumption processing for resuming the processing of the game from any position during replay by the game replay processing.

In the game resumption processing, the processing of the game is resumed from any position during replay by the game replay processing. Therefore, zest of the game can be enhanced.

A method of controlling a game device connected to a display according to one aspect includes performing processing of a game, accepting an operation onto the game, recording operation information accepted in the processing of the game for a predetermined period, replaying a status of play of the game on the display based on the recorded operation information, and resuming the processing of the game from any position during replay.

In the resuming the processing of the game, the processing of the game is resumed from any position during replay and hence zest of the game can be enhanced.

A game system according to one aspect includes a display, a game execution device for performing processing of a game, an operation acceptance device which accepts an operation onto the game, an operation information recording device which records for a predetermined period, operation information accepted by the operation acceptance device in the processing of the game, a game replay device which replays on the display, a status of play of the game based on the operation information recorded in the operation information recording device, and a game resumption device which resumes the processing of the game from any position during replay by the game replay device.

Since the game resumption device resumes the processing of the game from any position during replay by the game replay device, zest of the game can be enhanced.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 is a diagram illustrating operation information stored in a memory 40 based on the first embodiment.

FIG. 13 is a flowchart illustrating demonstration replay processing based on a second embodiment.

DETAILED DESCRIPTION OF NON-LIMITING EXAMPLE EMBODIMENTS

Figure 1:
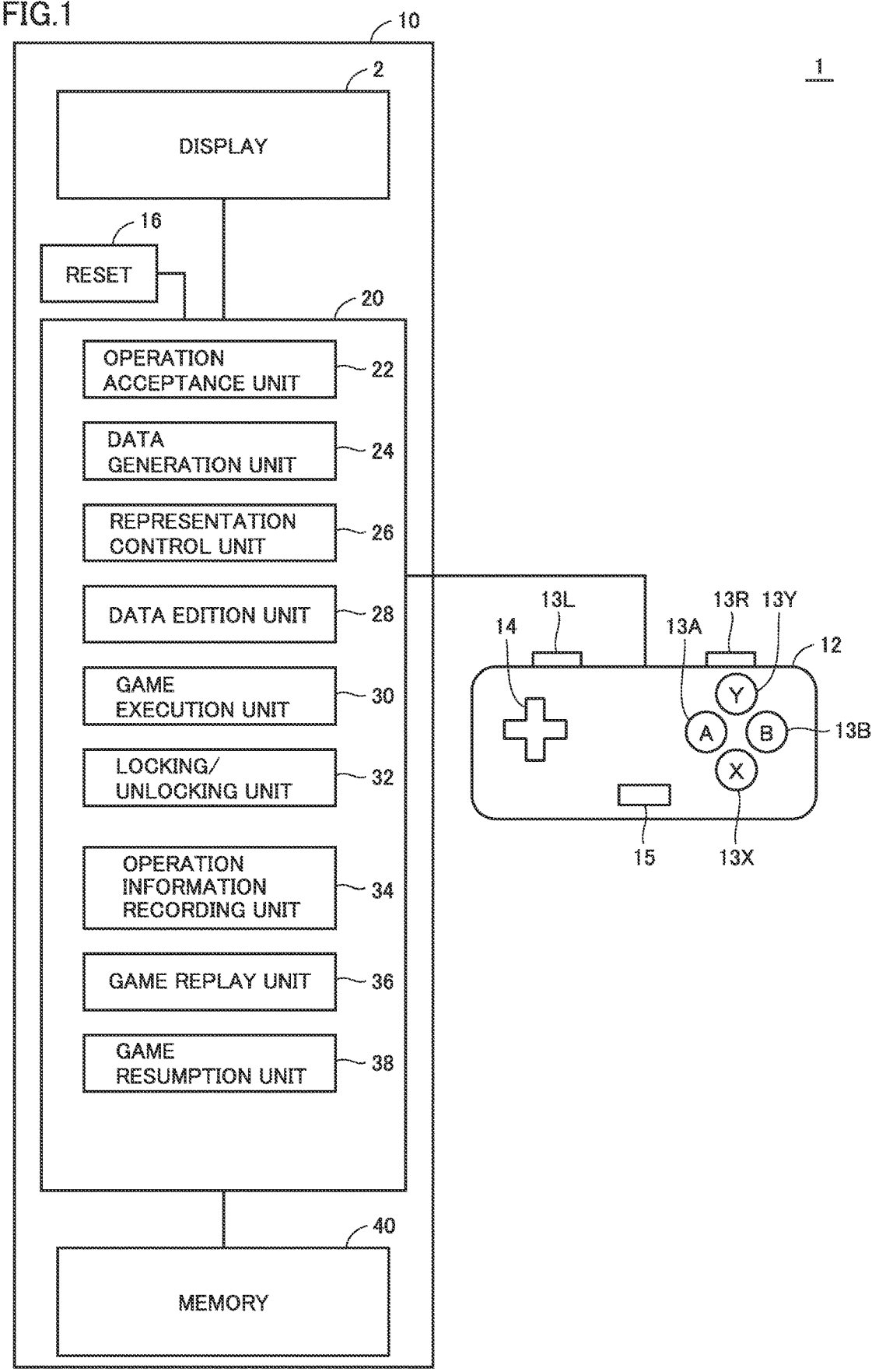
FIG. 1 is a schematic block diagram of a configuration of a game device 1 based on a first embodiment.

This embodiment will be described in detail with reference to the drawings. The same or corresponding elements in the drawings have the same reference characters allotted and description thereof will not be repeated.

An information processing apparatus in the present embodiment may be a portable (also referred to as mobile) device such as a portable game device, a portable telephone, or a smartphone, a stationary device such as a personal computer or a home game console, or a large apparatus such as an arcade game machine. In the present example, a game device representing one example of an information processing apparatus will be described by way of example.

First Embodiment

<Configuration of Game Device>

FIG. 1 is a schematic block diagram of a configuration of a game device 1 based on a first embodiment.

As shown in FIG. 1, game device 1 includes a game device main body 10, a console 12, and a reset button 16.

Game device main body 10 includes a display 2, a CPU 20, and a memory 40.

CPU 20 is an information processing unit for performing various types of information processing performed in game device 1. CPU 20 performs the various types of information processing with the use of memory 40. Memory 40 stores various programs (including a game program and a main body program) executed in game device 1. Though an example where memory 40 is implemented by a storage contained in game device 1 will be described, it may be implemented, for example, by a storage medium which can be attached to or removed from game device 1 such as an optical disc or a cartridge, or both of the storage and the storage medium.

In the present embodiment, in game device 1, memory 40 stores two types of programs which are at least a game program and a main body program.

The game program may be, for example, a game program which reads game data and performs game processing by using the game data.

The main body program is a program for controlling a game program. It provides an interface screen for performing a predetermined operation on a game program.

CPU 20 implements various functional blocks based on the main body program stored in memory 40.

CPU 20 includes an operation acceptance unit 22, a data generation unit 24, a representation control unit 26, a data edition unit 28, a game execution unit 30, a locking/unlocking unit 32, an operation information recording unit 34, a game replay unit 36, and a game resumption unit 38.

Operation acceptance unit 22 accepts an operation from console 12.

Data generation unit 24 generates point-of-suspension data in accordance with an instruction from reset button 16 accepted by operation acceptance unit 22. Point-of-suspension data includes operation information from console 12 accepted by operation acceptance unit 22 during a predetermined period and stored in memory 40 in response to an instruction from operation information recording unit 34.

Representation control unit 26 controls various representations on a menu screen on display 2.

Data edition unit 28 performs such processing as registration and edition of point-of-suspension data.

Game execution unit 30 performs execution of a game program.

Locking/unlocking unit 32 performs processing for locking (prohibiting edition of) or unlocking point-of-suspension data.

Operation information recording unit 34 has operation information stored in memory 40, the operation information being accepted by operation acceptance unit 22 during processing of a game.

Game replay unit 36 has display 2 replay a status of play of a game based on point-of-suspension data.

Game resumption unit 38 performs processing for resuming a game based on point-of-suspension data in accordance with an instruction accepted by operation acceptance unit 22.

Display 2 shows an image generated as a result of information processing by representation control unit 26. Display 2 shows a game image generated by game execution unit 30 and game resumption unit 38. Display 2 shows a reproduced image of a status of play generated by game replay unit 36.

Console 12 accepts an operation by a user such as an input through a button or a key.

An operation accepted in console 12 is output to CPU 20.

Console 12 includes a cross-shaped key 14, an A button 13A, a B button 13B, an X button 13X, a Y button 13Y, a select (SELECT) button 15, an L button 13L, and an R button 13R as input apparatuses.

Game device 1 may be implemented by a plurality of apparatuses. For example, game device 1 may be implemented by a main body apparatus having CPU 20 and an apparatus having console 12 and/or display 2, which are separate from each other. For example, in another embodiment, game device 1 may be implemented by a main body apparatus and a game device having console 12 and display 2, or by a main body apparatus and an operation apparatus having console 12. Game device 1 may employ a television as a display apparatus, without including display 2.

<Menu Screen>

Figure 2:
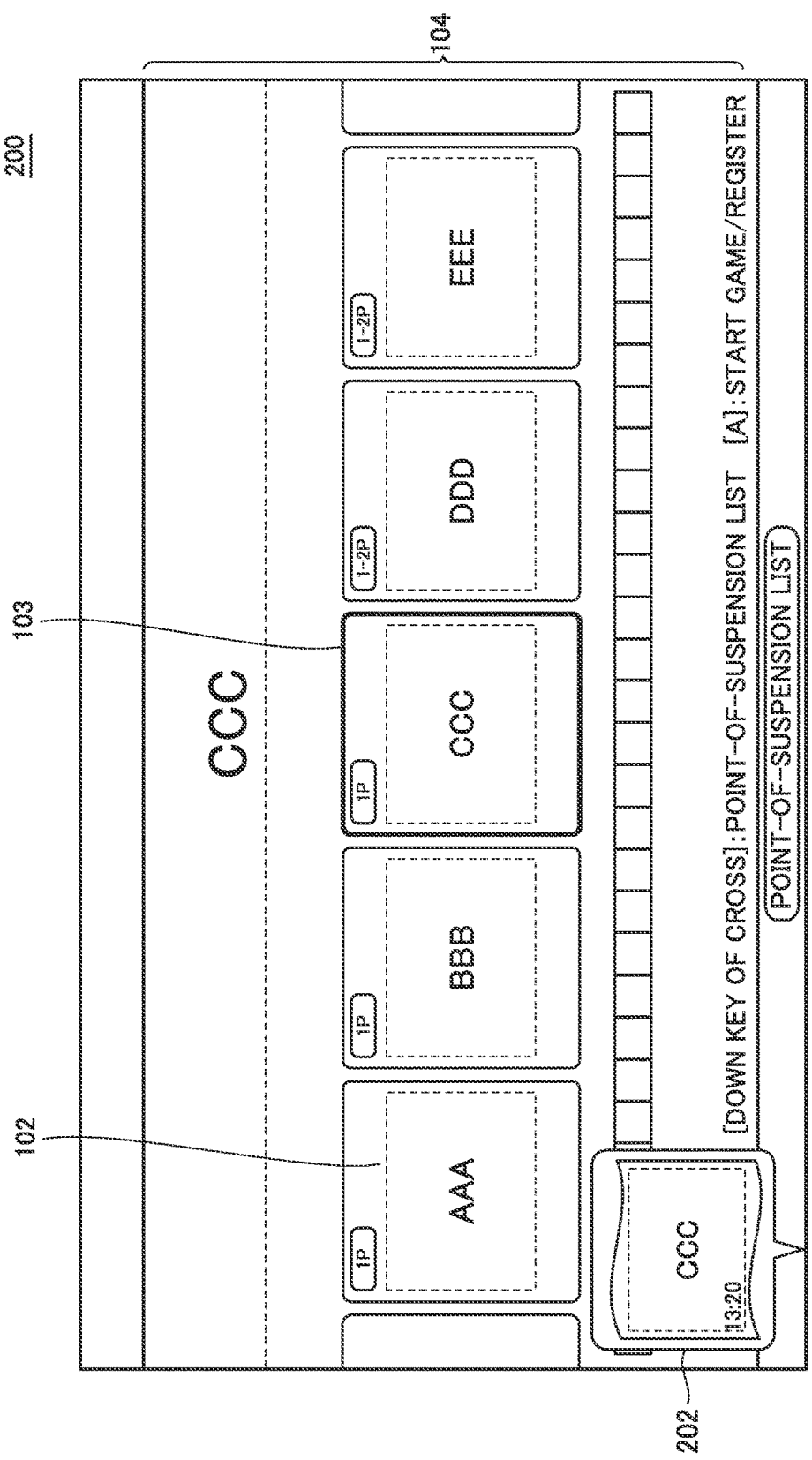
FIG. 2 is a diagram illustrating a menu screen 200 based on the first embodiment.

FIG. 2 is a diagram illustrating a menu screen 200 based on the first embodiment.

As shown in FIG. 2, menu screen 200 includes a game title list 104.

Some of a plurality of icons 102 corresponding to a plurality of game programs, respectively, are provided in game title list 104. In the present example, by way of example, five icons 102 are provided in game title list 104.

In the present example, a plurality of icons are laterally arranged in accordance with a predetermined order of arrangement. In an initial state, the "order of title name" is selected as a predetermined order of arrangement and arrangement is in accordance with that order of arrangement.

Therefore, icons 102 of game programs corresponding to the respective title names of "AAA", "BBB", "CCC", "DDD", and "EEE" are sequentially arranged and shown.

In the present example, by way of example, a plurality of icons 102 corresponding to the plurality of game programs, respectively, are arranged in the descending order of priority from the left to the right.

A selection cursor 103 is provided for one of the plurality of icons. Selection cursor 103 can be moved in the lateral direction (lateral scrolling) in accordance with an operation of a left or right key of cross-shaped key 14 in console 12. In the present example, selection cursor 103 is located at icon 102 of a game program corresponding to the title name "CCC" (in a selected state).

A point-of-suspension list which will be described later is further displayed in accordance with a predetermined operation of (a down key of) cross-shaped key 14 in console 12.

Execution (launch) of a game program corresponding to selection cursor 103 is indicated by an operation of A button 13A in console 12 and the game program is executed (launched). A point-of-suspension icon is registered in a slot in accordance with an operation of A button 13A in console 12, although description will be given later.

A point-of-suspension icon 202 is provided in menu screen 200. Point-of-suspension icon 202 is based on point-of-suspension data. When reset button 16 is selected during game processing, the game processing is suspended. When suspension processing of the game processing is performed, CPU 20 automatically generates point-of-suspension data (backup data) with which resumption of the game from the suspended position a predetermined period before or return to the game can be made. Furthermore, replay processing based on the point-of-suspension data can be performed.

Then, point-of-suspension icon 202 is displayed in accordance with the generated point-of-suspension data. By way of example, game processing of a game program having the title name "CCC" is suspended and point-of-suspension icon 202 of the game program having the title name "CCC" is provided.

The point-of-suspension data can also be shared with other users. Specifically, a list of users among which the point-of-suspension data can be shared is displayed by operating a predetermined button. When a user designates another user in the list, that another user is notified of sharing of the point-of-suspension data. When that another user accepts the notification, the point-of-suspension data is shared. That another user can resume the game or return to the game based on the shared point-of-suspension data. Thus, even at a game position where a first user has difficulty in clearing, the first user can be assisted as another user clears the game position.

The point-of-suspension data may be stored on an on-line database and another player may download the point-of-suspension data from the database and execute the same.

Point-of-suspension icon 202 has not yet been registered and it is displayed in a form indicating that fact. For example, the icon may be displayed in such an animated representation as floating and being unstable. For example, when icon 102 is selected and an instruction to launch a game is given before the icon is registered, the point-of-suspension data is erased. Processing for launching or replaying the game program based on the point-of-suspension data may be performed from that state in accordance with a predetermined instruction.

Figure 3:
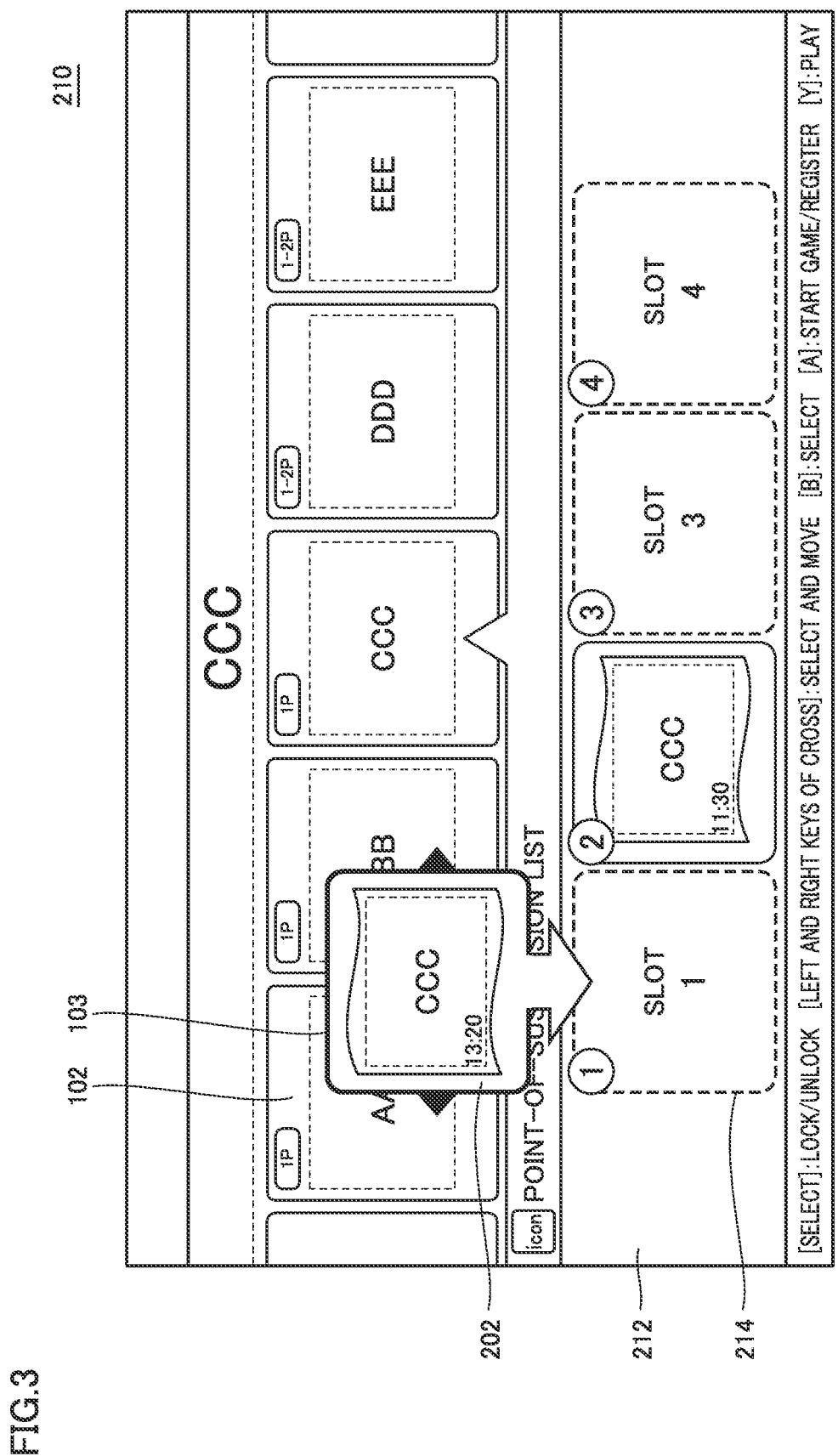
FIG. 3 is a diagram illustrating a menu screen 210 based on the first embodiment.

FIG. 3 is a diagram illustrating a menu screen 210 based on the first embodiment.

As shown in FIG. 3, as compared with menu screen 200, menu screen 210 further shows a point-of-suspension list screen 212.

Point-of-suspension list screen 212 is a screen in which a list of point-of-suspension data is displayed and the point-of-suspension data can be edited. Point-of-suspension list screen 212 is prepared for each of icons 102 of the plurality of game titles. In menu screen 200, by setting any icon 102 in a selected state (a state that selection cursor 103 is superimposed thereon), point-of-suspension list screen 212 corresponding to icon 102 is displayed in accordance with a predetermined operation of (the down key of) cross-shaped key 14 in console 12.

By way of example, point-of-suspension list screen 212 includes four slots (storage areas) 214. Point-of-suspension data can be stored in each slot 214.

Point-of-suspension data is stored in second slot 214.

Point-of-suspension icon 202 is in a selected state (in a state that selection cursor 103 is superimposed thereon). In this case, point-of-suspension icon 202 is displayed to be located above point-of-suspension list screen 212.

Point-of-suspension icon 202 can be stored in each slot. By setting point-of-suspension icon 202 in a selected state (a state that selection cursor 103 is superimposed thereon), point-of-suspension icon 202 can be moved over any slot 214 in accordance with an operation of the left or right key of cross-shaped key 14 in console 12 (moved to a position over slot 214).

By selecting A button 13A in console 12 in that state, point-of-suspension icon 202 can be stored (registered) in empty slot 214.

Without being limited to empty slot 214, point-of-suspension icon 202 can be stored also in slot 214 in which an icon has already been stored (overwriting).

For example, by moving point-of-suspension icon 202 to a position over second slot 214 and selecting A button 13A in console 12, point-of-suspension icon 202 can also be stored in second slot 214 (overwriting).

In order to prevent an erroneous overwriting operation, a screen for checking an overwriting instruction may be displayed. In order to prevent an erroneous operation, point-of-suspension icon 202 can also be stored in second slot 214 (overwriting) in accordance with an operation to press and hold (select for a predetermined period or longer) Y button 13Y in console 12. Alternatively, point-of-suspension data stored in slot 214 and point-of-suspension data indicated by point-of-suspension icon 202 selected with selection cursor 103 may be exchanged. As a result of exchange, data is not erased. If an erroneous operation is performed, it is also easy to return to the original state by making exchange again.

By setting point-of-suspension icon 202 to a selected state (a state that selection cursor 103 is superimposed thereon) and by performing a predetermined operation on console 12 (for example, selecting select button 15), a game program making use of the point-of-suspension data may be executed.

When an instruction to launch a game is given before storage (registration) of point-of-suspension icon 202 in slot 214, the point-of-suspension data is erased. When an instruction to launch a game is given before storage in slot 214 in the present example, point-of-suspension data is erased, however, it does not have to be erased.

Figure 4:
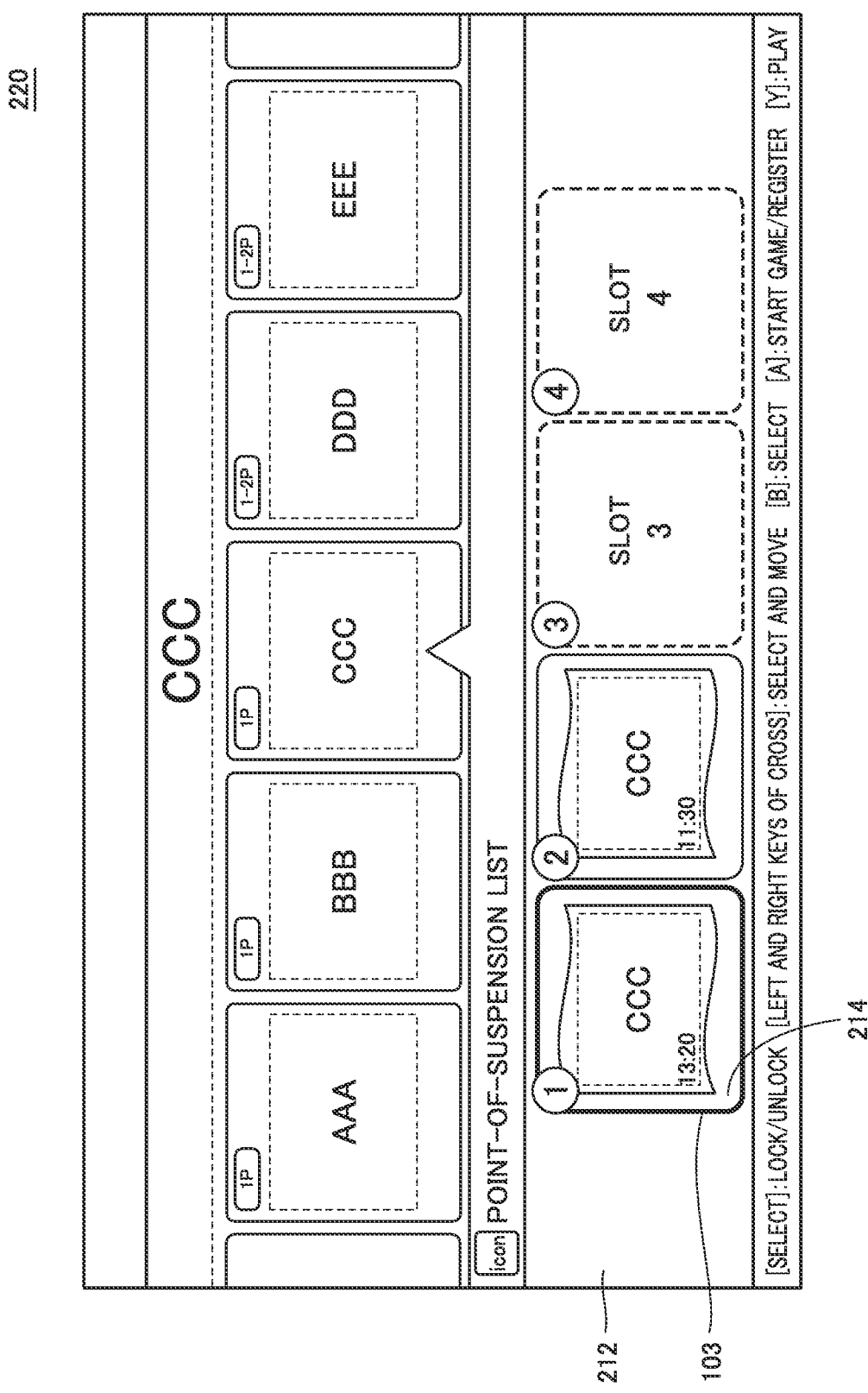
FIG. 4 is a diagram illustrating a menu screen 220 based on the first embodiment.

FIG. 4 is a diagram illustrating a menu screen 220 based on the first embodiment.

FIG. 4 shows menu screen 220 in which A button 13A in console 12 is selected while point-of-suspension icon 202 in menu screen 210 has been selected. Accordingly, in menu screen 220, point-of-suspension data corresponding to point-of-suspension icon 202 is stored (registered) in first slot 214 in point-of-suspension list screen 212.

Point-of-suspension data has been stored also in second slot 214.

By moving selection cursor 103 over slot 214 and selecting A button 13A, processing for launching the game program making use of the point-of-suspension data is performed. Time representation is given to the point-of-suspension icon stored in the slot, and for example, "13:20" means point-of-suspension data of which reset processing was performed at the time when game processing was performed for 13 minutes and 20 seconds. "11:30" means point-of-suspension data of which reset processing was performed at the time when game processing was performed for 11 minutes and 30 seconds. Owing to such time representation, which point-of-suspension data is made use of by a user can readily be identified and selected.

As a result of processing for launching a game program making use of point-of-suspension data, the game program can be resumed from the point (position) where reset processing was performed or from any position between that point and a point a predetermined period before.

By sharing the point-of-suspension data, other users can resume the game or return to the game based on the shared point-of-suspension data.

When a predetermined operation of (an up key of) cross-shaped key 14 in console 12 is performed, selection cursor 103 is moved to icons 102 of a plurality of game titles as described with reference to FIG. 2 and representation of point-of-suspension list screen 212 ends.

Figure 5:
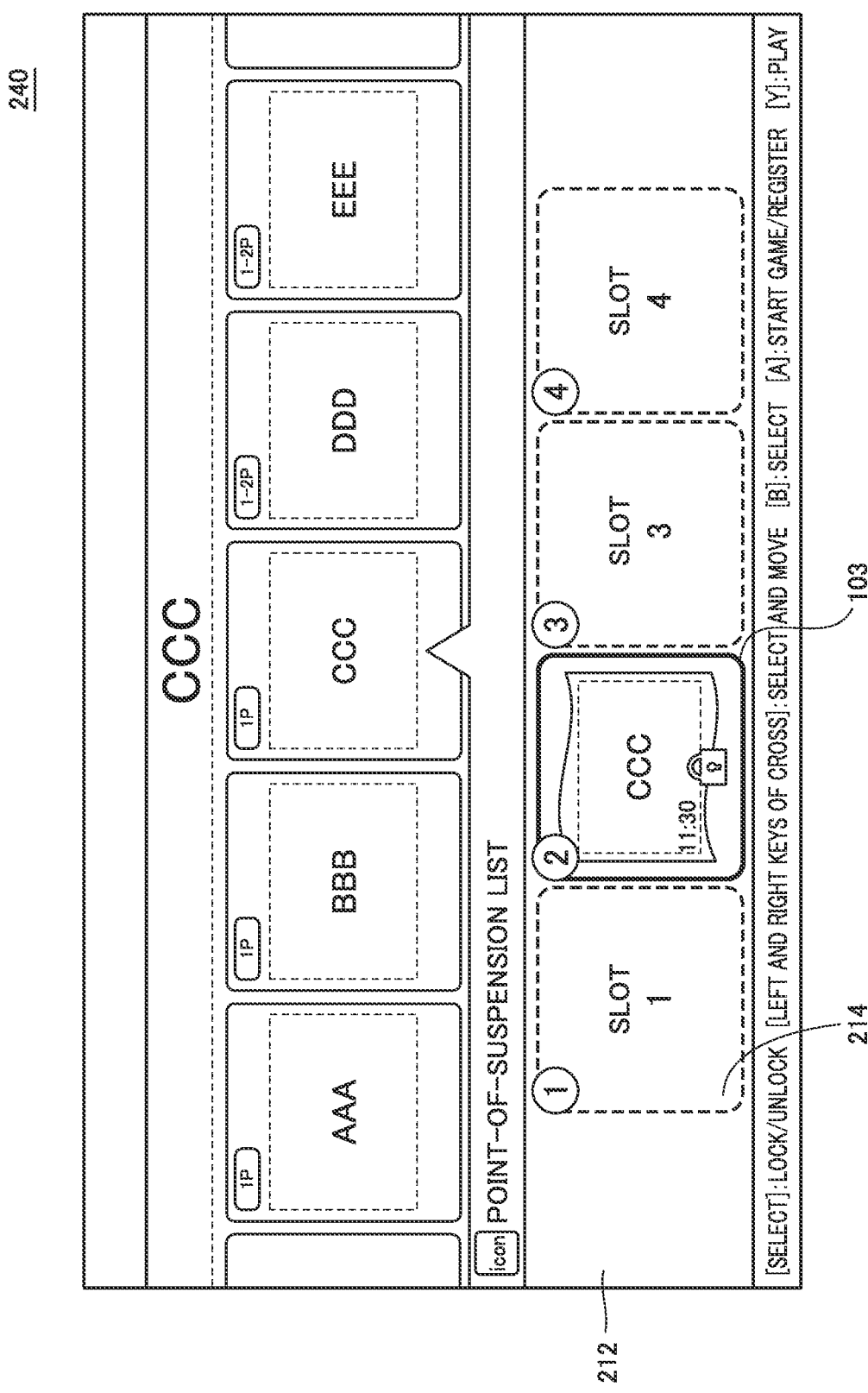
FIG. 5 is a diagram illustrating a menu screen 240 based on the first embodiment.

FIG. 5 is a diagram illustrating a menu screen 240 based on the first embodiment.

As shown in FIG. 5, menu screen 240 shows that second slot 214 has been locked.

When selection cursor 103 is moved and select button 15 is selected while point-of-suspension data is stored in slot 214, the point-of-suspension data is locked (edition thereof is prohibited). In the present example, a lock icon is added. When selection cursor 103 is moved over the locked point-of-suspension data and select button 15 is selected, the point-of-suspension data is unlocked. When locked, edition (erase) of the point-of-suspension data in slot 214 is prohibited. Edition (overwriting) of slot 214 is also prohibited.

<Flow Processing>

Figure 6:
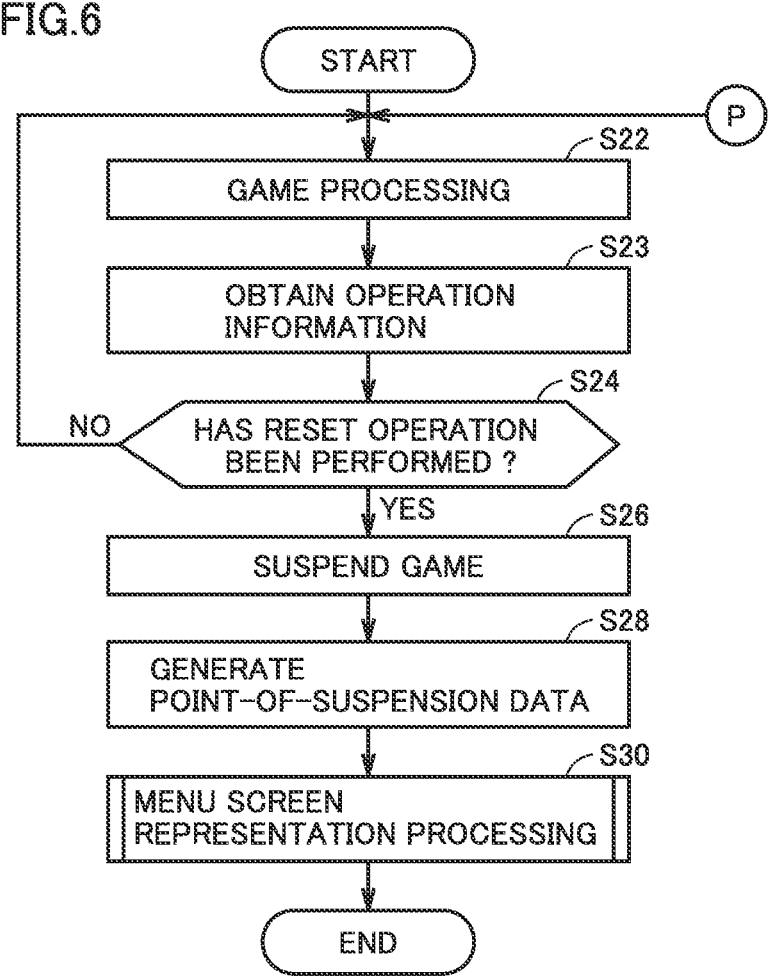
FIG. 6 is a flowchart illustrating overview of reset processing in game device 1 based on the first embodiment.

FIG. 6 is a flowchart illustrating overview of reset processing in game device 1 based on the first embodiment. Processing is mainly performed by CPU 20.

As shown in FIG. 6, CPU 20 performs game processing (step S22). Specifically, game execution unit 30 performs game processing based on a launched game program. By way of example, a game program having the title name "CCC" is launched.

Then, CPU 20 obtains operation information during game processing (step S23). Operation information recording unit 34 has memory 40 store operation information accepted by operation acceptance unit 22 during game processing.

FIG. 7 is a diagram illustrating operation information stored in memory 40 based on the first embodiment.

As shown in FIG. 7, together with a duration of a game, operation data (the A button and the B button) associated with the duration of the game is registered.

In the present example, operation information recording unit 34 has memory 40 store operation information for a predetermined period as operation log data.

By way of example, game processing for forced scrolling is performed.

The duration of the game represents a time period since start of game processing. With the duration of the game, a state of the game (a position in the game) since start of game processing can be specified. Operation information associated with the duration of the game is registered.

Operation information recording unit 34 has operation information for five minutes stored by way of example of a predetermined period. When the predetermined period elapses, operation information recording unit 34 has the operation information stored in memory 40 overwritten.

Specifically, operation information recording unit 34 has older operation information overwritten.

Therefore, after lapse of a predetermined period, operation information for a period of five preceding minutes before a time point in game processing is always held in memory 40.

When game processing is suspended, operation information for a period of five preceding minutes before the position of suspension is stored in memory 40 as operation log data.

Thus, the game program can be resumed from any position between a point (a position) of reset processing and a point a predetermined time before (five minutes before).

Though operation information is registered in association with a duration of a game and a state of the game (a position in the game) is specified based on the information in the present example, limitation thereto is not intended and any form is applicable so long as information specifying a state of the game (a position in the game) and operation data are associated with each other. For example, a program code specifying a state of the game (a position in the game) and operation data may be associated with each other. Alternatively, in a case of a game in which a player object can freely be moved in a virtual space in response to an operation by a user, a position coordinate of the player object in the virtual space and operation data may be associated with each other. Other associated data to be used in game processing can also further be stored together with operation data, without being limited to the operation data.

Operation information for a predetermined period is provided with a flag specifying a position indicative of a 1-minute interval so that replay processing per chapter (minute) set for each game can be performed.

Referring again to FIG. 6, CPU 20 determines whether or not a reset operation has been performed (step S24).

Specifically, operation acceptance unit 22 determines whether or not reset button 16 has been selected (operated).

When CPU 20 determines that a reset operation has not been performed (NO in step S24), the process returns to step S22 and the processing above is repeated.

When CPU 20 determines that a reset operation has been performed (YES in step S24), it suspends the game (step S26). Specifically, when operation acceptance unit 22 determines that reset button 16 has been selected, it gives an instruction to game execution unit 30. Accordingly, game execution unit 30 suspends the game processing.

Then, CPU 20 generates point-of-suspension data (step S28). Specifically, game execution unit 30 gives an instruction to data generation unit 24 and data generation unit 24 generates point-of-suspension data with which game processing can be resumed or reproduced from a position of suspension or from any position between that position and a position a predetermined period before.

Data generation unit 24 generates point-of-suspension data based on operation information stored in memory 40 under the control by operation information recording unit 34.

Then, CPU 20 performs menu screen representation processing (step S30). Details of the menu screen representation processing will be described later.

Then, the process ends (end).

Figure 8:
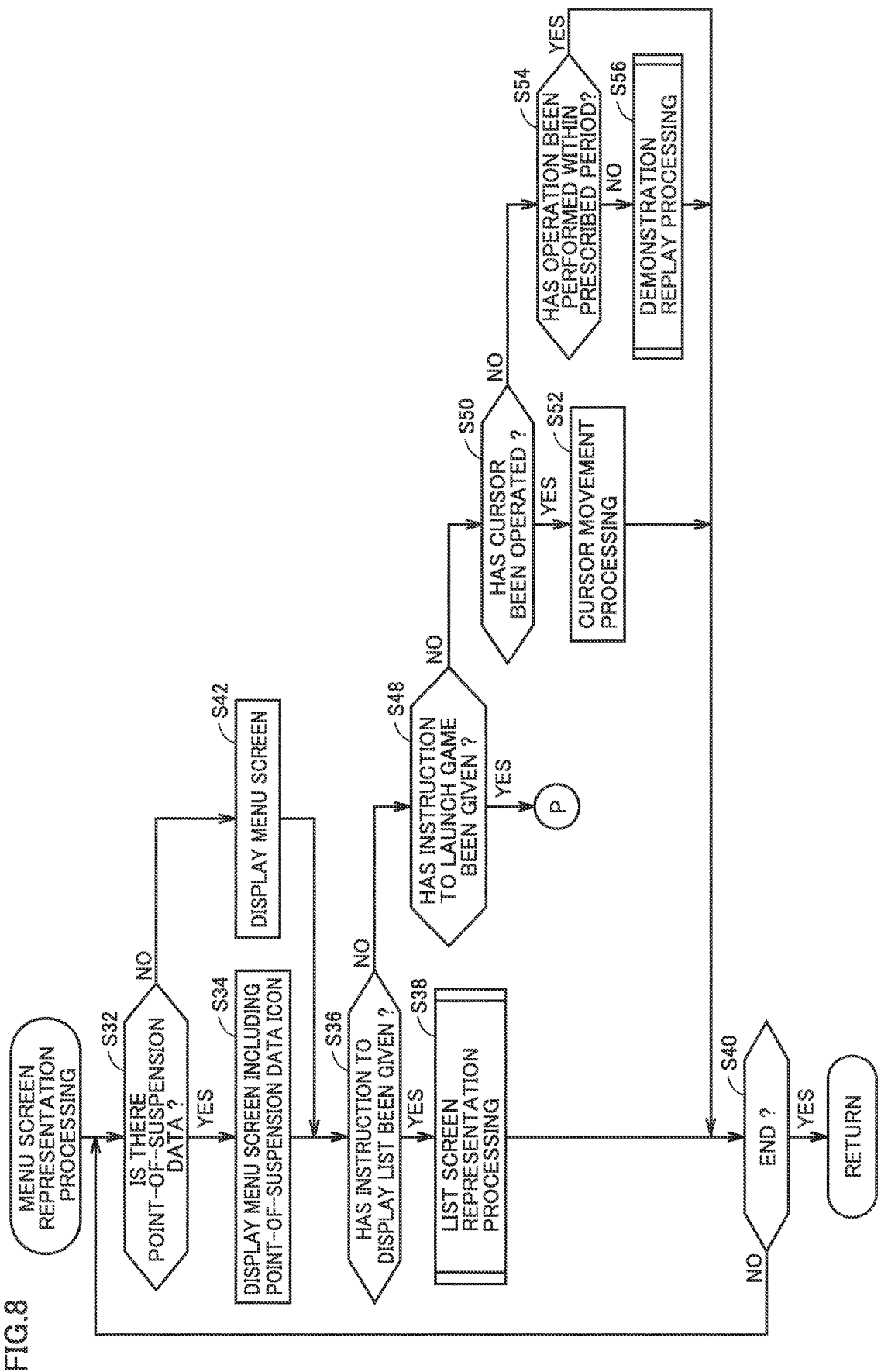
FIG. 8 is a flowchart illustrating menu screen representation processing based on the first embodiment.

FIG. 8 is a flowchart illustrating menu screen representation processing based on the first embodiment.

As shown in FIG. 8, CPU 20 determines whether or not there is point-of-suspension data (step S32). Representation control unit 26 determines whether or not there is point-of-suspension data generated by data generation unit 24.

When CPU 20 determines that there is point-of-suspension data (YES in step S32), it has a menu screen including a point-of-suspension icon displayed (step S34). When representation control unit 26 determines that there is point-of-suspension data generated by data generation unit 24 as described with reference to FIG. 2, it has a menu screen including a point-of-suspension icon displayed.

When CPU 20 determines that there is no point-of-suspension data (NO in step S32), it has a normal menu screen displayed (step S42).

Then, CPU 20 determines whether or not an instruction to display a list of point-of-suspension data has been given (step S36). Specifically, operation acceptance unit 22 sets any icon 102 of a plurality of game titles in the menu screen to a selected state and determines whether or not an operation of the down key of cross-shaped key 14 in console 12 has been accepted.

When CPU 20 determines in step S36 that an instruction to show a list of point-of-suspension data has been given (YES in step S36), it performs list screen representation processing (step S38). Representation control unit 26 has the list screen displayed in accordance with an instruction from operation acceptance unit 22. Details of the list screen representation processing will be described later.

Then, CPU 20 determines whether or not the process has ended (step S40).

When CPU 20 determines in step S40 that the process has ended (YES in step S40), the process ends (return).

When CPU 20 determines in step S40 that the process has not ended (NO in step S40), the process returns to step S32 and the processing above is repeated.

When CPU 20 determines that an instruction to display a list of point-of-suspension data has not been given (NO in step S36), it determines whether or not an instruction to launch a game has been given (step S48). Specifically, operation acceptance unit 22 determines whether or not selection of A button 13A in console 12 has been accepted while selection cursor 103 is superimposed on icon 102.

When CPU 20 determines in step S48 that an instruction to launch a game has been given (YES in step S48), the process proceeds to "P" and to step S22 in FIG. 6. In response to an instruction from operation acceptance unit 22, game execution unit 30 launches a game program corresponding to selected icon 102 and performs game processing. Subsequent processing is the same.

When CPU 20 determines in step S48 that an instruction to launch a game has not been given (NO in step S48), it determines whether or not a cursor has been operated (step S50). Specifically, operation acceptance unit 22 determines whether or not an operation of the left or right key of cross-shaped key 14 has been accepted.

When CPU 20 determines in step S50 that the cursor has been operated (YES in step S50), it performs processing for moving the cursor (step S52). In accordance with an instruction from operation acceptance unit 22 (an operation of the left or right key of cross-shaped key 14), representation control unit 26 moves selection cursor 103.

Then, the process proceeds to step S40.

When CPU 20 determines in step S50 that the cursor has not been operated (NO in step S50), it determines whether or not the cursor has been operated within a predetermined period (step S54).

When CPU 20 determines in step S54 that the cursor has been operated within a predetermined period (YES in step S54), the process proceeds to step S40. When CPU 20 determines in step S54 that the cursor has been not operated within a predetermined period (NO in step S54), it performs demonstration replay processing (step S56).

Details of the demonstration replay processing will be described later.

The process then proceeds to step S40.

Figure 9:
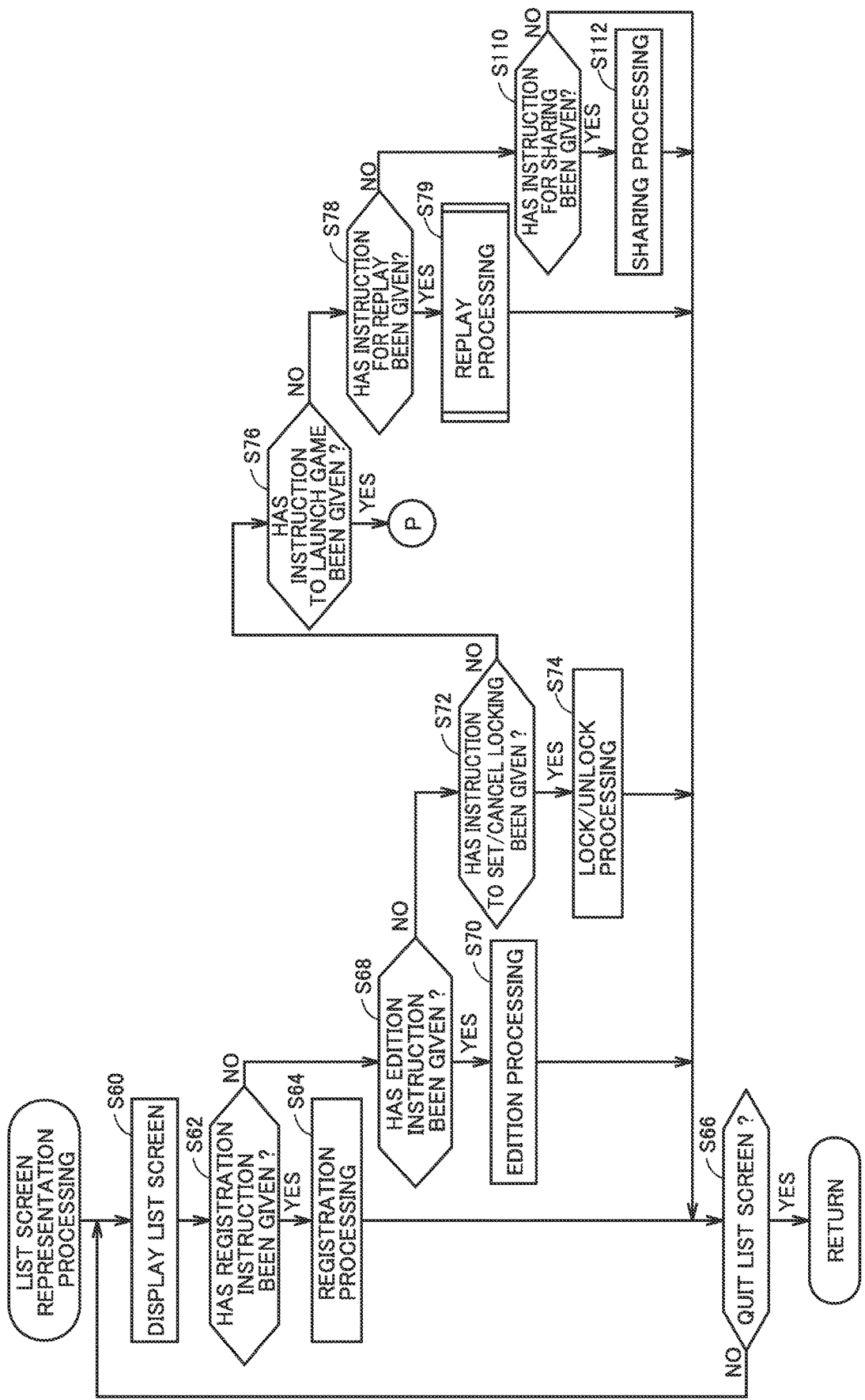
FIG. 9 is a flowchart illustrating list screen representation processing based on the first embodiment.

FIG. 9 is a flowchart illustrating list screen representation processing based on the first embodiment.

As shown in FIG. 9, CPU 20 performs processing for displaying a point-of-suspension list screen (step S60). Specifically, representation control unit 26 additionally shows point-of-suspension list screen 212 as described with reference to FIG. 3.

Then, CPU 20 determines whether or not a registration instruction has been given (step S62). Specifically, as described with reference to FIG. 3, when point-of-suspension icon 202 has been selected, operation acceptance unit 22 determines whether or not an operation of A button 13A in console 12 has been accepted.

When CPU 20 determines in step S62 that a registration instruction has been given (YES in step S62), it performs registration processing (step S64). Specifically, when operation acceptance unit 22 has accepted an operation of A button 13A in console 12, it determines that a registration instruction has been given and gives an instruction to data edition unit 28. Data edition unit 28 performs processing for storing point-of-suspension data in slot 214 as described with reference to FIG. 4.

Then, CPU 20 determines whether or not a list screen has ended (step S66). CPU 20 determines whether or not it has given an instruction to quit processing for displaying the list screen. Specifically, operation acceptance unit 22 determines whether or not it has accepted a predetermined operation of (the up key of) cross-shaped key 14 while selection cursor 103 is superimposed on slot 214 in point-of-suspension list screen 212. In this case, operation acceptance unit 22 gives an instruction to representation control unit 26 and representation control unit 26 quits representation of the point-of-suspension list screen.

When CPU 20 determines in step S66 that processing for displaying the list screen has ended, the process ends (return).

When CPU 20 determines in step S66 that the processing has not ended (NO in step S66), the process returns to step S60.

When CPU 20 determines in step S62 that a registration instruction has not been given (NO in step S62), it determines whether or not an edition instruction has been given (step S68). Specifically, operation acceptance unit 22 determines whether or not it has accepted an operation of B button 13B while selection cursor 103 is superimposed on slot 214 in point-of-suspension list screen 212.

When CPU 20 determines in step S68 that an edition instruction has been given (YES in step S68), it performs edition processing (step S70). Specifically, data edition unit 28 sets point-of-suspension data stored in slot 214 on which selection cursor 103 is superimposed to a selected state in response to an instruction from operation acceptance unit 22 and performs the edition processing. For example, though not shown, point-of-suspension data may be erased by moving point-of-suspension icon 202 over a trash box icon. A position of point-of-suspension icon 202 can be changed by moving point-of-suspension icon 202 over empty slot 214. Data in slot 214 may be overwritten or replaced by moving point-of-suspension icon 202 over slot 214 in which point-of-suspension data has been stored.

Then, the process proceeds to step S66.

When CPU 20 determines in step S68 that an edition instruction has not been given (NO in step S68), it determines whether or not an instruction to set/cancel locking has been given (step S72). Specifically, operation acceptance unit 22 determines whether or not an operation of select button 15 has been performed while selection cursor 103 has been moved over slot 214 in which point-of-suspension data has been stored. When an operation of select button 15 has been performed, operation acceptance unit 22 determines that an instruction to set/cancel locking has been given and gives an instruction to locking/unlocking unit 32.

When CPU 20 determines in step S72 that an instruction to set/cancel locking has been given (YES in step S72), it performs locking/unlocking processing (step S74).

In response to an instruction from operation acceptance unit 22, locking/unlocking unit 32 locks the point-of-suspension data (prohibition of edition). As shown in FIG. 5, a state that a lock icon has been added is displayed. When operation acceptance unit 22 accepts selection of select button 15 as a result of movement of selection cursor 103, locking/unlocking unit 32 unlocks the locked point-of-suspension data.

When locking/unlocking unit 32 locks the point-of-suspension data, edition (erase) of the point-of-suspension data in slot 214 is prohibited. Edition (overwriting) of slot 214 is also prohibited. Then, the process proceeds to step S66.

When CPU 20 determines in step S72 that an instruction to set/cancel locking has not been given (NO in step S72), it determines whether or not an instruction to launch a game has been given (step S76). Operation acceptance unit 22 determines whether or not selection of A button 13A in console 12 has been accepted while selection cursor 103 is superimposed on slot 214 in point-of-suspension list screen 212.

When CPU 20 determines in step S76 that an instruction to launch a game has been given (YES in step S76), the process proceeds to "P" and to step S22 in FIG. 6. In response to the instruction from operation acceptance unit 22, game resumption unit 38 launches a game program making use of point-of-suspension data corresponding to selected slot 214 and performs processing for resuming a game from a point (position) of reset processing. Subsequent processing is the same.

When CPU 20 determines in step S76 that an instruction to launch a game has not been given (NO in step S76), it determines whether or not an instruction for replay has been given (step S78). Specifically, operation acceptance unit 22 determines whether or not it has accepted selection of Y button 13Y in console 12 while selection cursor 103 has been moved over slot 214 where the point-of-suspension data has been stored.

When CPU 20 determines in step S78 that an instruction for replay has been given (YES in step S78), it performs replay processing (step S79).

Game replay unit 36 performs replay processing based on the point-of-suspension data in accordance with the instruction from operation acceptance unit 22. Replay processing will be described later. Then, the process proceeds to step S66.

When CPU 20 determines in step S78 that an instruction for replay has not been given (NO in step S78), it determines whether or not an instruction for sharing has been given (step S110). Specifically, operation acceptance unit 22 determines whether or not selection of select button 15 in console 12 has been accepted while selection cursor 103 has been moved over slot 214 where the point-of-suspension data has been stored.

When CPU 20 determines in step S110 that the instruction for sharing has been given (YES in step S110), it performs sharing processing (step S112).

Data edition unit 28 shows a list of users among which the point-of-suspension data can be shared. When a user designates another user in the list, data edition unit 28 notifies that another user of sharing of the point-of-suspension data. When that another user accepts the notification, the point-of-suspension data is shared. That another user can resume the game or return to the game based on the shared point-of-suspension data. Thus, even at a game position where a first user has difficulty in clearing, the first user is assisted as another user clears the game position.

When CPU 20 determines in step S110 that the instruction for sharing has not been given (NO in step S110), the process proceeds to step S66.

<Replay Screen>

Figure 10:
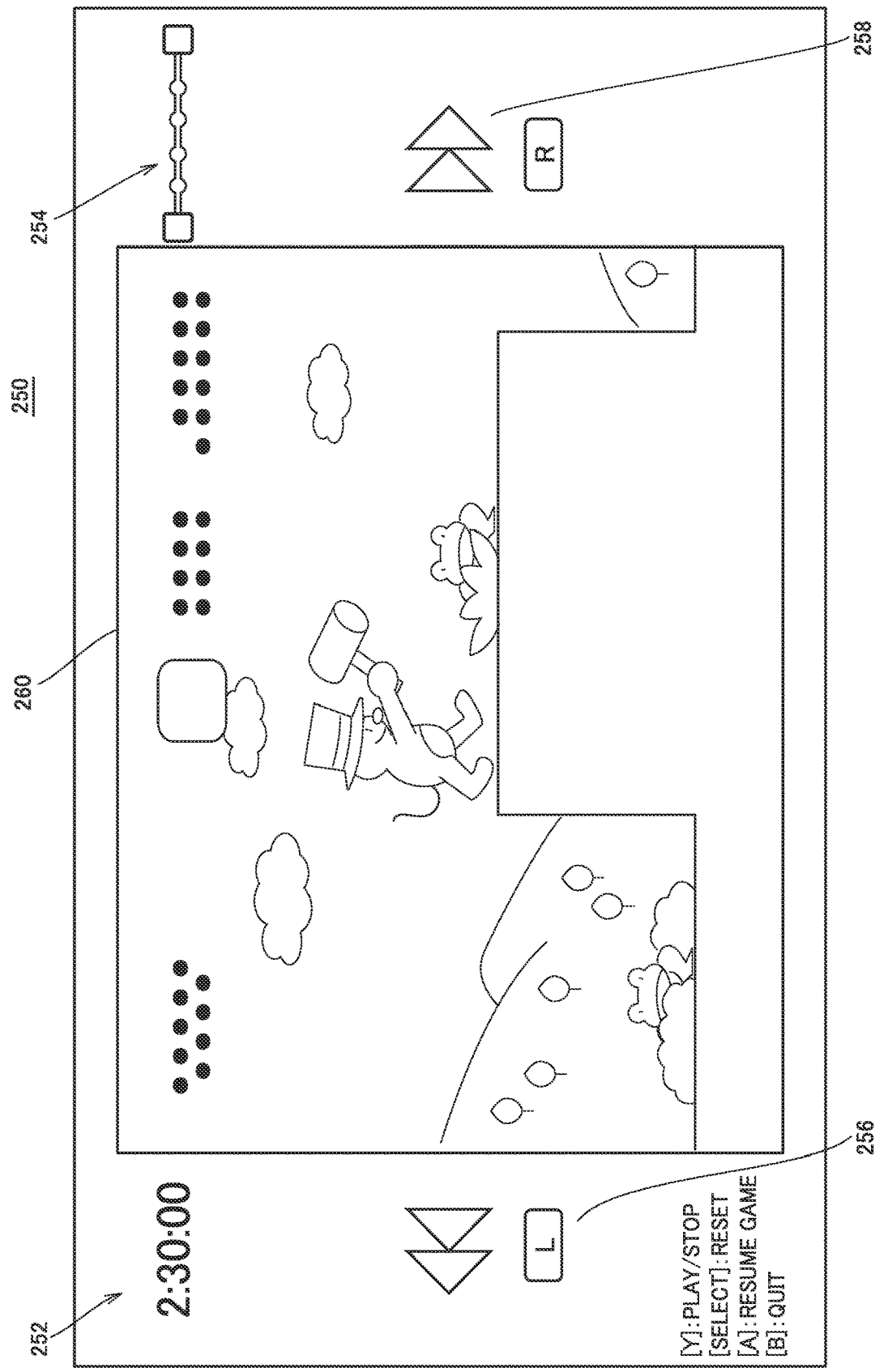
FIG. 10 is a diagram illustrating a replay screen 250 based on the first embodiment.

FIG. 10 is a diagram illustrating a replay screen 250 based on the first embodiment.

FIG. 10 shows replay screen 250, and game replay unit 36 replays a status of play of a game based on operation information and has the replayed status of play shown.

By way of example, a time representation 252 is provided, which indicates that a status of play after lapse of two minutes and thirty seconds, of point-of-suspension data for five preceding minutes before a position of suspension stored in memory 40 is displayed.

A chapter representation 254 is provided. The five-minute period is divided into one-minute segments.

Replay screen 250 shows a forward instruction object 258 and a rearward instruction object 256.

By operating L button 13L or R button 13R provided in console 12, a user can skip to a top position (a suspension start point) of each chapter (each one minute) and replay from that position can be performed. Specifically, R button 13R functions as a button for providing a forward instruction input. L button 13L functions as a button for providing a rearward instruction input.

Switching between play processing and stop processing can be made by operating Y button 13Y.

Reset processing is performed by operating select button 15. By doing so, a user may return to the menu screen which is the initial screen.

Replay processing is quitted ("quit" processing) by operating B button 13B. By doing so, the user returns to the menu screen before Y button 13Y is operated.

Game resumption processing is performed by operating A button 13A.

Therefore, the user can perform game resumption processing by operating A button 13A at any position while the user watches replay screen 250.

Specifically, on replay screen 250, statuses of play for five minutes are replayed as point-of-suspension data. The user can perform game resumption processing at intended timing while the user checks the status of play of the user himself/herself. Therefore, since the user can check the status of play of the user himself/herself, the user can readily remember a game scene and zest of the game can be enhanced.

When a plurality of pieces of point-of-suspension data are stored in a plurality of slots, each game scene can readily be checked in the replay processing. Therefore, desired point-of-suspension data can be selected and zest of the game can be enhanced.

Figure 11:
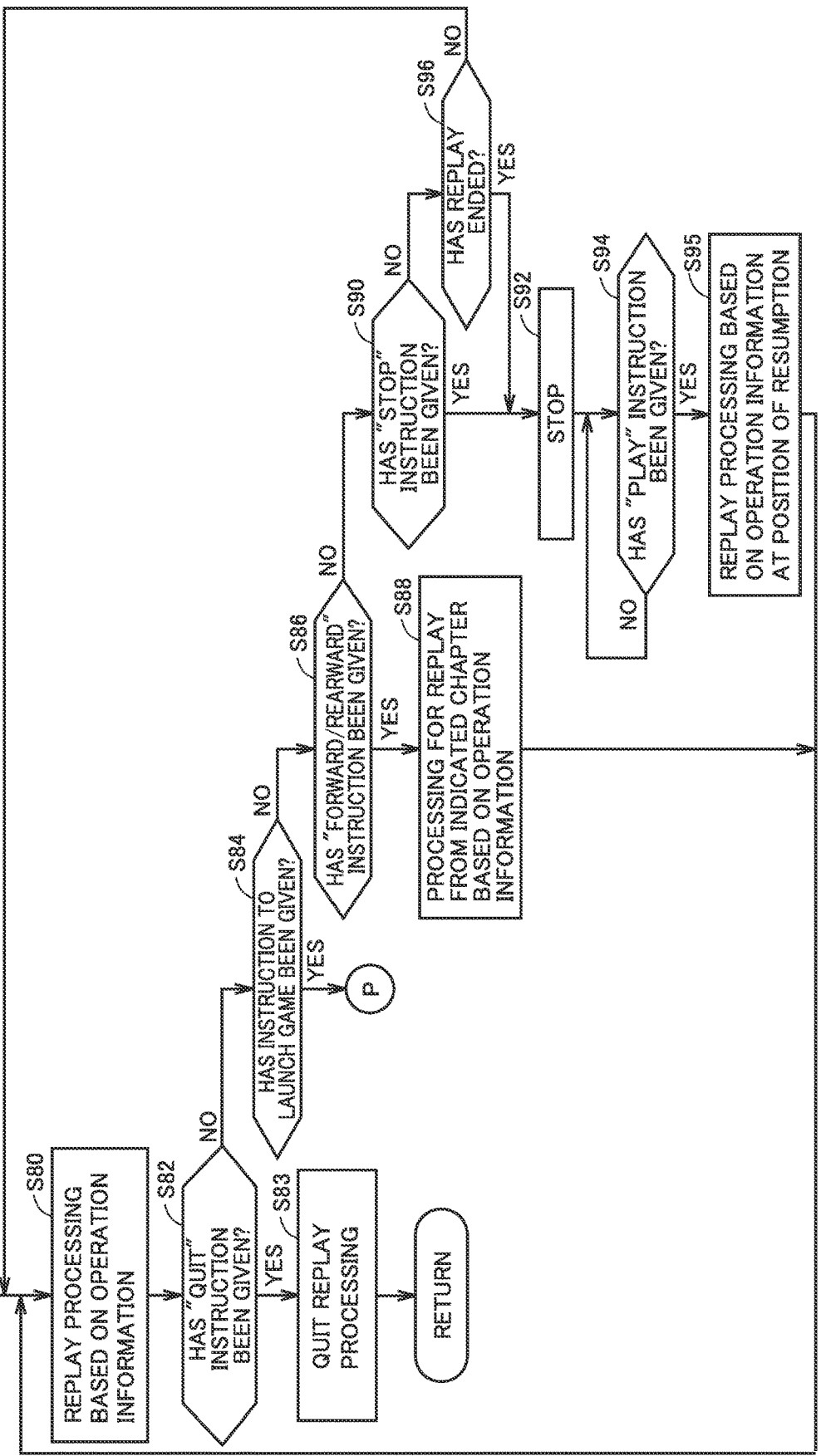
FIG. 11 is a flowchart illustrating replay processing based on the first embodiment.

FIG. 11 is a flowchart illustrating replay processing based on the first embodiment.

As shown in FIG. 11, CPU 20 performs replay processing based on operation information (step S80). Specifically, game replay unit 36 performs replay processing based on operation information in connection with point-of-suspension data described with reference to FIG. 10.

Then, CPU 20 determines whether or not a "quit" instruction has been given (step S82). Specifically, as described with reference to FIG. 10, operation acceptance unit 22 determines whether or not an operation of B button 13B in console 12 has been accepted.

When CPU 20 determines in step S82 that the "quit" instruction has been given (YES in step S82), the CPU quits replay processing (step S83).

Then, the process ends (return). Specifically, the process proceeds to step S66.

When CPU 20 determines in step S82 that the "quit" instruction has not been given (NO in step S82), it determines whether or not an instruction to launch a game has been given (step S84). Specifically, as described with reference to FIG. 10, operation acceptance unit 22 determines whether or not it has accepted an operation of A button 13A in console 12.

When CPU 20 determines in step S84 that an instruction to launch a game has been given (YES in step S84), the process proceeds to "P" and to step S22 in FIG. 6. In response to an instruction from operation acceptance unit 22, game resumption unit 38 launches a game program making use of point-of-suspension data corresponding to selected slot 214 and performs processing for resuming a game from a point (position) where an instruction to resume the game has been given by operating A button 13A. Through the processing, the processing for resuming the game from any position during replay processing can be performed.

When CPU 20 determines in step S84 that an instruction to launch a game has not been given (NO in step S84), it determines whether or not a "forward/rearward" instruction has been given (step S86). Specifically, as described with reference to FIG. 10, operation acceptance unit 22 determines whether or not it has accepted an operation of L button 13L or R button 13R in console 12.

When CPU 20 determines in step S86 that a "forward/rearward" instruction has been given (YES in step S86), it performs processing for replay from an indicated chapter based on operation information (step S88). Specifically, as described with reference to FIG. 10, operation acceptance unit 22 performs processing for replay from a top position of each chapter (each one minute) in accordance with the operation of L button 13L or R button 13R in console 12.

Then, the process proceeds to step S80.

When CPU 20 determines in step S86 that a "forward/rearward" instruction has not been given (NO in step S86), it determines whether or not a "stop" instruction has been given (step S90). Specifically, as described with reference to FIG. 10, operation acceptance unit 22 determines whether or not it has accepted an operation of Y button 13Y in console 12 during processing for replaying a status of play.

When CPU 20 determines in step S90 that a "stop" instruction has been given (YES in step S90), it stops replay processing (step S92).

Then, CPU 20 determines in step S94 whether or not a "play" instruction has been given. Specifically, as described with reference to FIG. 10, operation acceptance unit 22 determines whether or not it has accepted an operation of Y button 13Y in console 12 while replay processing is not performed.

When CPU 20 determines in step S94 that a "play" instruction has been given (YES in step S94), it performs replay processing based on operation information at a position of resumption (step S95). When the position of resumption is located at a position of end of point-of-suspension data, that is, a position of suspension, the position of resumption goes back to the top and processing for replay from the top position of the point-of-suspension data (five preceding minutes before the position of suspension) is performed.

Then, the process proceeds to step S80.

When CPU 20 determines in step S90 that a "stop" instruction has not been given (NO in step S90), it determines whether or not replay has ended (step S96). Specifically, whether or not replay processing of point-of-suspension data has reached an end position is determined.

When CPU 20 determines in step S96 that replay has not ended (NO in step S96), the process returns to step S80 and the processing above is repeated.

When CPU 20 determines in step S96 that replay has ended (YES in step S96), the process proceeds to step S92 and replay processing is stopped. Since subsequent processing is the same as described above, detailed description thereof will not be repeated.

In accordance with the processing above, the user can perform game resumption processing at any position by operating A button 13A while the user operates replay screen 250.

An example in which point-of-suspension data based on operation information for five preceding minutes before a point (position) of reset processing is generated and replay processing based on the point-of-suspension data is performed is described above. The period of five minutes is by way of example and can be set to any period. Specifically, the period can be set in advance in accordance with a type of a game. For example, for a simulation game or a role playing game, the predetermined period may be set to be long, and for an action game, the predetermined period may be set to relatively be short.

(Modification)

Figure 12:
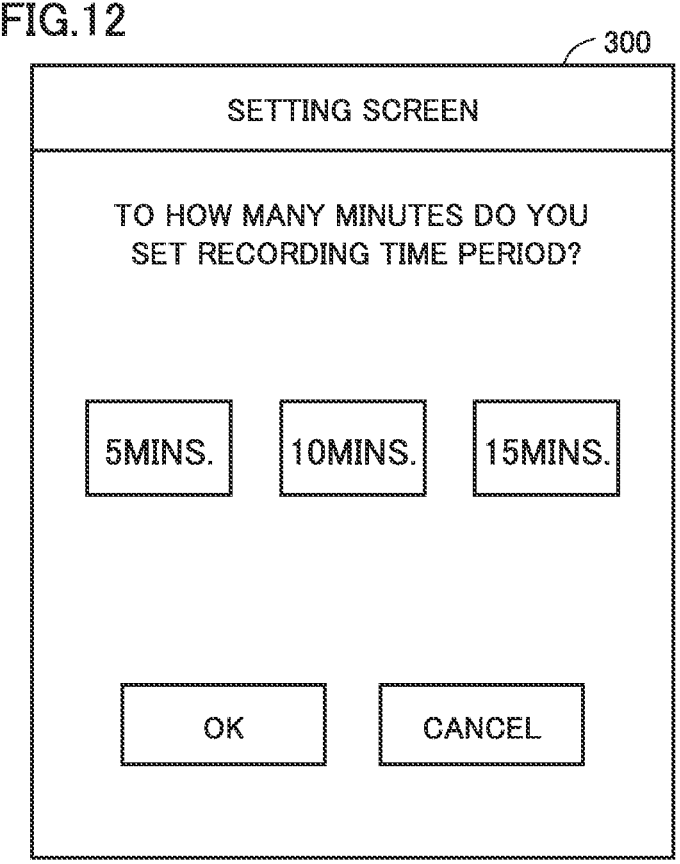
FIG. 12 is a diagram illustrating a setting screen 300 based on a modification of the first embodiment.

FIG. 12 is a diagram illustrating a setting screen 300 based on a modification of the first embodiment.

As shown in FIG. 12, in setting screen 300, together with a message "to how many minutes do you set recording time period?", icons for setting a recording time period including "5 mins.," "10 mins.," and "15 mins." are provided.

Setting screen 300 is displayed when operation acceptance unit 22 accepts a predetermined operation from console 12. Operation information recording unit 34 has memory 40 store operation information for a set recording time period based on the setting.

By selecting "5 mins." and selecting an "OK" button, operation information for five preceding minutes before the position of suspension can be stored.

By selecting "10 mins." and selecting the "OK" button, operation information for ten preceding minutes before the position of suspension can be stored.

By selecting "15 mins." and selecting the "OK" button, operation information for fifteen preceding minutes before the position of suspension can be stored.

With setting screen 300, the user can set a desired recording time period. By adjusting a time period of storage of operation information in memory 40 with such a scheme, the user can perform processing for resuming a game from a desired position and zest of a game can be enhanced.

Second Embodiment

FIG. 13 is a flowchart illustrating demonstration replay processing based on a second embodiment.

As shown in FIG. 13, CPU 20 extracts point-of-suspension data (step S100). Specifically, operation acceptance unit 22 gives an instruction to game replay unit 36 when it determines that an operation of a cursor has not been performed for a predetermined period. Game replay unit 36 extracts point-of-suspension data stored in slot 214 in memory 40 described above.

Then, CPU 20 performs processing for replaying point-of-suspension data (step S102).

Then, CPU 20 determines whether or not an operation has been performed (step S104).

When CPU 20 determines in step S104 that an operation has been performed (YES in step S104), the process ends (return).

When CPU 20 determines in step S104 that an operation has not been performed (NO in step S104), the process returns to step S102 and processing for replaying point-of-suspension data is continued.

In demonstration replay processing, game replay unit 36 replays a status of play based on the point-of-suspension data and has the replayed status of play shown.

Thus, the user can readily check a status of play of the user himself/herself with the demonstration replay processing and zest of the game can be enhanced. The user can remember a past status of play of the user himself/herself and the user is more encouraged to resume the game.

When there are a plurality of pieces of point-of-suspension data, the point-of-suspension data can be replayed in the order of recency of point-of-suspension data.

Point-of-suspension data to be extracted can also be prioritized.

Specifically, as described with reference to FIG. 5, locked point-of-suspension data may preferentially be extracted and subjected to demonstration replay processing. Demonstration replay processing may be performed with point-of-suspension data latest in time and day of locking being prioritized.

Depending on a type of a game, point-of-suspension data with which demonstration replay processing is to be performed may individually be set. The set point-of-suspension data may be replayed first.

Alternatively, by making use of a countdown timer function with which a remaining time period is counted, partial data including the remaining time period designated in point-of-suspension data may be replayed first. For example, when a remaining time period of forty five seconds is designated, replay of game scenes for the last remaining forty five seconds of point-of-suspension data may be started.

In demonstration replay processing, a time period for replay of extracted point-of-suspension data can also naturally be adjusted as appropriate, rather than full-length replay.

An application executable by a personal computer may be provided as a program in the present embodiment. The program according to the present embodiment may be incorporated as some functions of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a game program executed by a computer of a game device connected to a display, the game program causing the computer to perform operations comprising:
    game processing including performing processing of a game;
    operation acceptance processing including accepting operation inputs for the game;
    operation information recording processing including automatically recording operation inputs accepted in the operation acceptance processing;
    for points of suspension of the game, storing game save state information and corresponding operation inputs that were automatically recorded during predetermined time periods leading up to the points of suspension; and
    game resumption processing including using said stored game save state information and said stored operation inputs automatically recorded during a predetermined time period before a selected point of suspension to enable the game to be resumed from any time instant within the predetermined time period leading up to the selected point of suspension.

2. The storage medium according to claim 1, wherein
in the operation acceptance processing, an operation to give a resumption instruction is accepted during replay by game replay processing for replaying a status of play of the game on the display based on the recorded operation inputs and the stored game save state information, and
in the game resumption processing, the processing of the game is resumed from a position where the operation to give the resumption instruction is accepted in the operation acceptance processing during replay by the game replay processing.

3. The storage medium according to claim 1, wherein
in the operation information recording processing, the operation inputs accepted in the operation acceptance processing in the processing of the game are recorded for at least the predetermined period before a point of suspension of the processing of the game.

4. The storage medium according to claim 1, wherein
the game program further causes the computer to perform recording time period setting processing for setting the predetermined period during which the operation inputs are to be recorded in accordance with a type of the game, and
in the operation information recording processing, the operation inputs accepted in the operation acceptance processing in the processing of the game are recorded for the predetermined period set in the recording time period setting processing.

5. The storage medium according to claim 1, wherein
in the operation information recording processing, older operation information of the recorded operation information is sequentially updated when recording of the operation inputs reaches the predetermined period.

6. The storage medium according to claim 1, wherein
a suspension start point is set every predetermined time period within the predetermined period and associated with at least one of a plurality of pieces of operation inputs recorded for the predetermined period, and
in game replay processing, the processing of the game is resumed based on the operation inputs recorded in the operation input recording processing associated with the set suspension start point.

7. The storage medium according to claim 1, wherein
the game program further causes the computer to perform recording time period setting processing for setting the predetermined period during which the operation inputs are to be recorded in accordance with an instruction for the operation acceptance processing.

8. The storage medium according to claim 1, wherein
the game program further causes the computer to perform menu screen control processing for displaying a menu screen on the display, and
in game replay processing, when a predetermined condition is satisfied while the menu screen is displayed on the display as a result of the menu screen control processing, a status of play of the game is replayed based on the operation inputs recorded in the operation information recording processing.

9. A game device connected to a display, the game device comprising a processor, the processor performing operations comprising:
    game execution processing including performing processing of a game,
    operation acceptance processing including accepting operation inputs for the game,
    operation information recording processing for recording operation inputs accepted in the operation acceptance processing in the processing of the game,
    suspension processing including storing backup data for a point of suspension of the game and the recorded operation inputs for a predetermined period leading up to the point of suspension;
    game replay processing including replaying a status of play of the game on the display based on the stored backup data, and
    game resumption processing including using said stored recorded operation inputs to enable processing of the game to be resumed beginning at any time instant within said predetermined period leading up to the point of suspension during replay by the game replay processing.

10. A method of controlling a game device connected to a display, the method comprising:
    performing processing of a game;
    accepting an operation for the game;
    recording operation information accepted in the processing of the game;
    storing backup data for a point of suspension of the game, the backup data including recorded operation information accepted in the processing of the game for predetermined time interval leading up to the point of suspension;

replaying a status of play of the game on the display based on the recorded operation information and the stored backup data; and using the recorded operation information for a said predetermined time period leading up to the point of suspension to resume processing of the game from any time instant during the said predetermined time period leading up to the point of suspension.

11. A game system comprising:

a display;

a user input device operatively connected to a processor, the user input device accepting operation information for the game;

an operation information storage device connected to the processor which records operation information accepted by the user input device in the processing of the game;

the processor configured to perform processing of a game in response to the accepted operation information for the game and to perform suspension processing including storing backup data for points of suspension of the game, the backup data including recorded operation information accepted by the user input device during predetermined time intervals leading up to the points of suspension;

the processor being further configured to replay on the display, a status of play of the game based on the operation information recorded in the operation information storage device and the stored backup data; and the processor being further configured to use the stored backup data including recorded operation information accepted by the user input device during a predetermined time interval leading up to a said point of suspension to resume processing of the game from any time instant within the predetermined time interval leading up to the said point of suspension during replay.

12. The non-transitory storage medium of claim 1 wherein the game resumption processing enables a user to select, at time of replay, a time instant within the predetermined time period leading up to the selected point of suspension for beginning replay.

13. The game device of claim 9 wherein the game resumption processing enables a user to select, at time of replay, a time instant within the predetermined period leading up to the point of suspension for beginning replay.

14. The game device of claim 9 wherein the game resumption processing enables a user to select between plural point of suspensions for beginning replay.

15. The method of claim 10 wherein using the recorded operation information for a said predetermined time period leading up to the point of suspension to resume processing of the game from any time instant during the said predetermined time period leading up to the point of suspension enables a user to select, at time of replay, a time instant within the predetermined time period leading up to the point of suspension for beginning replay.

16. The method of claim 10 wherein using the recorded operation information for a said predetermined time period leading up to the point of suspension to resume processing of the game from any time instant during the said predetermined time period leading up to the point of suspension enables a user to select between plural points of suspension for beginning replay.

17. The game system of claim 11 wherein the processor is further configured to enable a user to select, at time of replay, a time instant within the predetermined time interval leading up to the point of suspension for beginning replay.

18. The game system of claim 11 wherein the processor is further configured to enable a user to select, at time of replay, between plural points of suspension for beginning replay.

* * * * *